US011506572B2

(12) United States Patent
Boisset et al.

(10) Patent No.: US 11,506,572 B2
(45) Date of Patent: Nov. 22, 2022

(54) METHOD FOR LOCATING THE POSITION OF EACH WHEELSET OF A MOTOR VEHICLE

(71) Applicant: Continental Automotive GmbH, Hannover (DE)

(72) Inventors: Jean-Philippe Boisset, Toulouse (FR); Nicolas Guinart, Toulouse (FR); Jean-Charles Huard, Toulouse (FR)

(73) Assignee: Continental Automotive GmbH

( * ) Notice: Subject to any disclaimer, the term of this patent is extended or adjusted under 35 U.S.C. 154(b) by 95 days.

(21) Appl. No.: 17/140,354

(22) Filed: Jan. 4, 2021

(65) Prior Publication Data
US 2021/0208028 A1 Jul. 8, 2021

(30) Foreign Application Priority Data
Jan. 7, 2020 (FR) ...................................... 2000096

(51) Int. Cl.
*G01M 17/02* (2006.01)
*B60C 11/24* (2006.01)
(Continued)

(52) U.S. Cl.
CPC ............ *G01M 17/02* (2013.01); *B60C 11/246* (2013.01); *B60C 23/064* (2013.01); *G01G 19/08* (2013.01); *G01L 17/00* (2013.01); *G08C 17/02* (2013.01)

(58) Field of Classification Search
CPC ............ B60C 23/0435; B60C 23/0416; B60C 23/0489; B60C 23/0488; B60C 23/0415;
(Continued)

(56) References Cited

U.S. PATENT DOCUMENTS 6,112,587 A * 9/2000 Oldenettel .......... B60C 23/0488
340/447
6,688,168 B1 * 2/2004 Elliott .................. G01G 19/022
73/146
(Continued)

FOREIGN PATENT DOCUMENTS

CN 105383230 A 3/2016
CN 110023110 A 7/2019
(Continued)

OTHER PUBLICATIONS

French Search Report and Written Opinion for French Application No. FR20000096, dated Apr. 15, 2020, 9 pages.
Chinese Office Action for Chinese Application No. 202110011419. 7, dated Jul. 5, 2022, with translation, 10 pages.

*Primary Examiner* — Nimeshkumar D Patel
*Assistant Examiner* — Gedeon M Kidanu
(74) *Attorney, Agent, or Firm* — RatnerPrestia

(57) ABSTRACT

A method for locating the position of each wheelset of a motor vehicle. Each wheelset including at least one wheel equipped with an electronic unit including at least one sensor to measure, for the wheel, the extent of the contact patch via which the tire is in contact with the ground, and a transmitter transmitting data regarding the extent of the tire contact patch to a control unit. The motor vehicle includes a load sensor for each of the wheelsets that measures and delivers to the control unit a value for the load supported by the associated wheelset. The method employing, on the one hand, data originating from a sensor able to determine the extent of the contact patch via which a tire is in contact with the ground and, on the other hand, a load sensor able to measure the load supported by a wheelset of the motor vehicle.

10 Claims, 2 Drawing Sheets

(51) Int. Cl.
*B60C 23/06* (2006.01)
*G01G 19/08* (2006.01)
*G01L 17/00* (2006.01)
*G08C 17/02* (2006.01)

(58) Field of Classification Search
CPC ............ B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12; H02S 10/12; H02S 20/21; H02S 20/22
See application file for complete search history.

(56) References Cited

U.S. PATENT DOCUMENTS

| | | | |
|---|---|---|---|
| 7,832,264 | B2 | 11/2010 | Suzuki et al. |
| 9,579,935 | B2 | 2/2017 | Infantini |
| 10,052,921 | B2 * | 8/2018 | Bettecken ........... B60C 23/0416 |
| 10,449,810 | B2 | 10/2019 | Guinart et al. |
| 2014/0005956 | A1 * | 1/2014 | Patel ...................... B60C 23/04 |
| | | | 702/41 |
| 2014/0019003 | A1 * | 1/2014 | Guinart ................... B60C 23/00 |
| | | | 701/34.4 |
| 2018/0114379 | A1 * | 4/2018 | Guinart ............... B60C 23/0488 |
| 2020/0086697 | A1 | 3/2020 | Fischer et al. |
| 2020/0156650 | A1 | 5/2020 | Kretschmann et al. |

FOREIGN PATENT DOCUMENTS

| | | | | |
|---|---|---|---|---|
| CN | 110446619 A | | 11/2019 | |
| DE | 112006001020 T5 | | 2/2008 | |
| DE | 102007014765 | | 10/2008 | |
| DE | 102007014765 A1 * | | 10/2008 | ......... B60C 23/0416 |
| EP | 3237239 B1 * | | 3/2019 | ............. B60C 11/24 |
| FR | 2974033 A1 | | 10/2012 | |
| FR | 3072165 | | 4/2019 | |
| KR | 20190054276 A | | 5/2019 | |
| WO | 2012035121 | | 3/2012 | |
| WO | 2012085655 A2 | | 6/2012 | |
| WO | 2016102379 A1 | | 6/2016 | |

* cited by examiner

[Fig. 1]
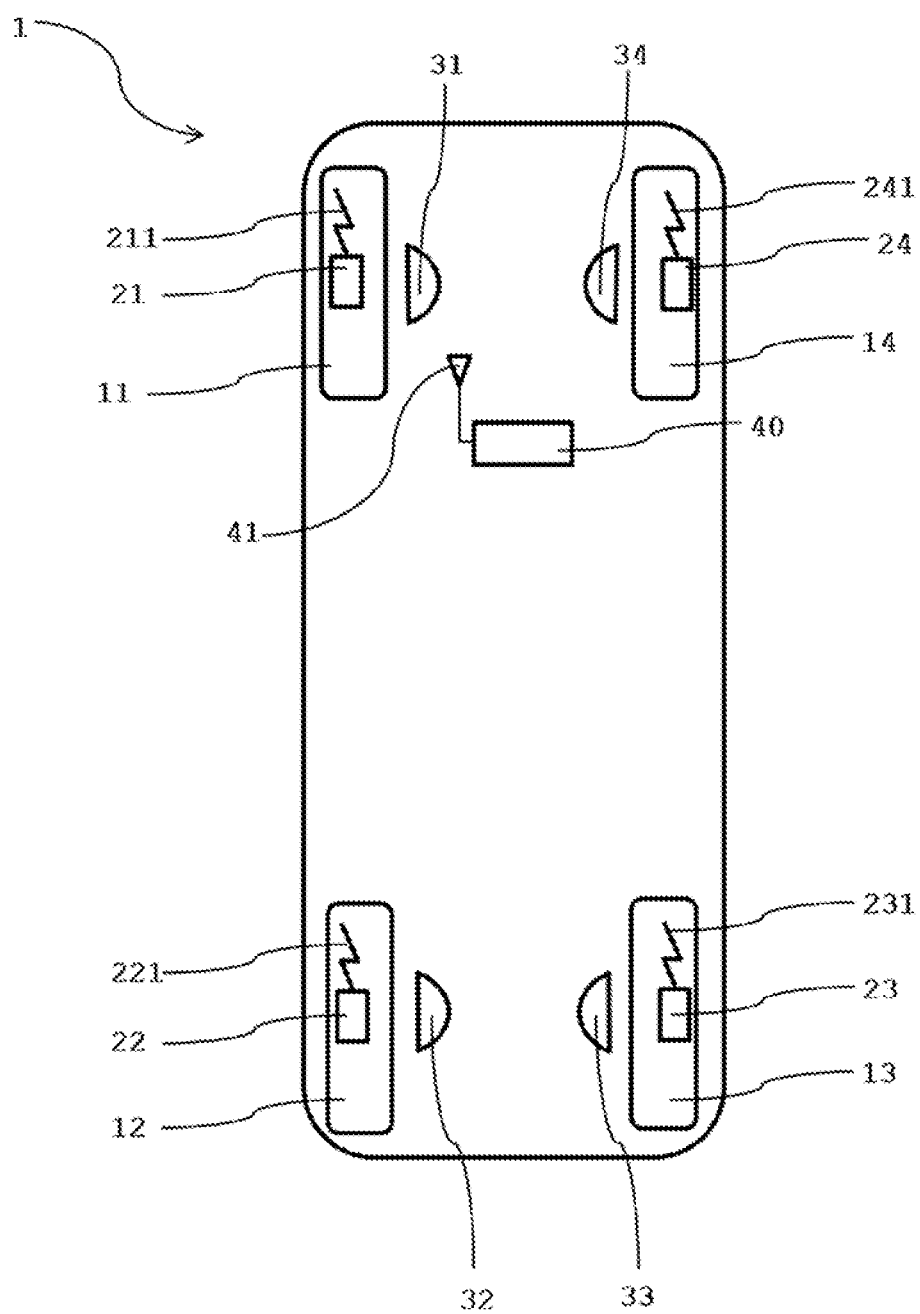

[Fig. 2]
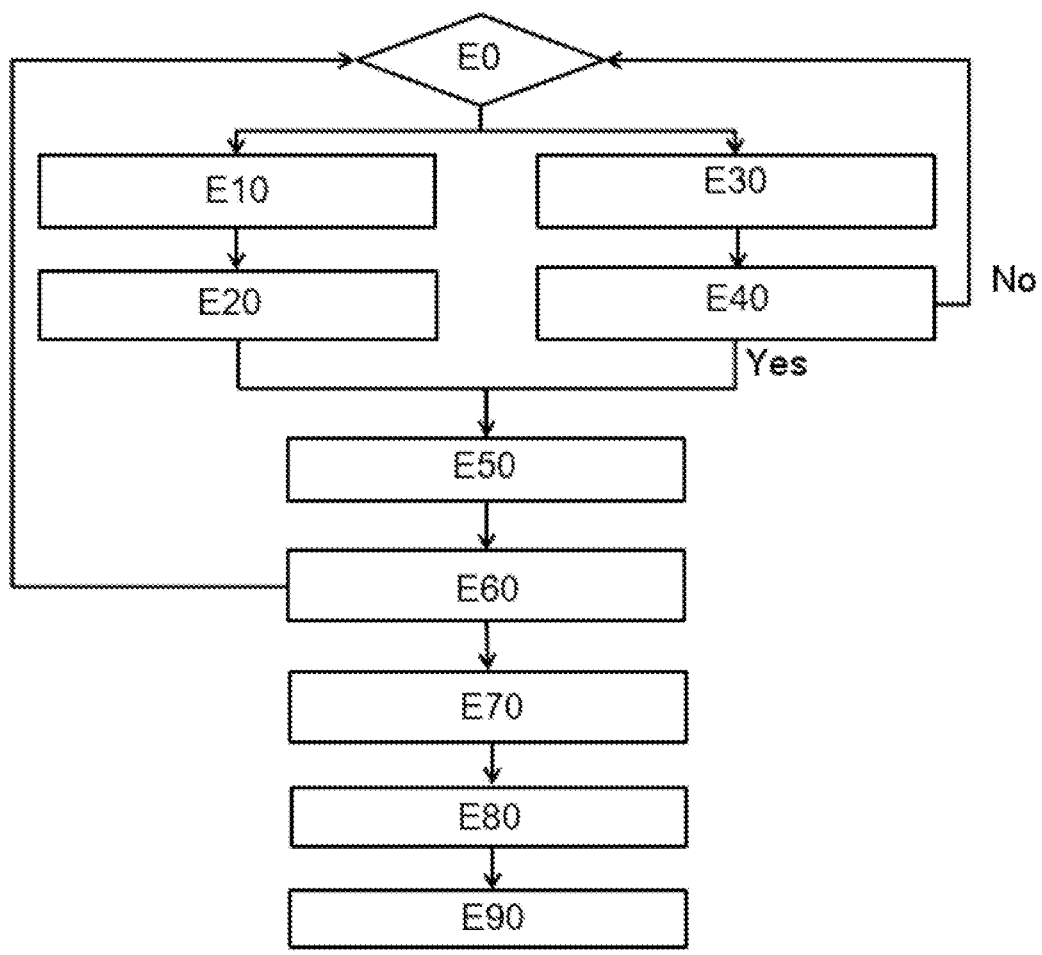

METHOD FOR LOCATING THE POSITION OF EACH WHEELSET OF A MOTOR VEHICLE

CROSS REFERENCE TO RELATED APPLICATIONS

This application claims priority to French Patent Application No. 2000096, filed Jan. 7, 2020, the contents of such application being incorporated by reference herein.

FIELD OF THE INVENTION

The technical sector of the present invention relates to methods for locating the position of the electronic units with which each wheel of a motor vehicle is equipped.

BACKGROUND OF THE INVENTION

It is known practice to equip each wheel of a motor vehicle with a monitoring system comprising sensors which are mounted on each wheel of the vehicle. These sensors allow a certain number of parameters, such as the pressure and the temperature of the tires with which the wheels are equipped, to be measured. This allows the driver to be kept informed as to the condition of the tires of each wheel.

TPMS sensors for example may be fixed to the end of the tire valve and inform the driver of the pressure and temperature of the tire. TPMS sensors may also be installed in the tread of the tire and thus inform the driver notably as to the pressure, the temperature and the wear of the tire, but also as to the extent of the contact patch via which the wheel is in contact with the ground. Knowledge regarding this contact patch also makes it possible to evaluate the load supported by the wheel and the thickness of rubber of the wheel. However, this type of sensor is not able to detect uneven tire wear because these sensors feed back only mean wear. Document EP 3237239 A1 (WO2016102379), incorporated herein by reference, describes a method making it possible to determine the load supported by a wheel from the size of the contact patch via which the wheel is in contact with the ground.

Monitoring systems take the form of an electronic unit further comprising parameter sensors, a microprocessor, a data signal transmitter and possibly a signal receiver. The transmitter is able to transmit a signal containing the data collected by the sensor to a control unit situated on the motor vehicle. The control unit for its part is provided with a computer and with a signal receiver so as to receive and analyze the signals originating from the monitoring systems.

However, the signal transmitted by the monitoring systems does not contain information relating to the location of the electronic unit. Now, it is necessary to associate with each transmitted signal information regarding the location of the monitoring system so that the position of each wheel of the motor vehicle can be located and the driver informed as to the location of, for example, a worn tire.

There are in existence numerous solutions that make it possible to locate the position of each wheel of a motor vehicle. The known document FR 2974033, incorporated herein by reference, for example describes an electronic unit comprising means for measuring the angular position of the electronic unit and a transmitter intended to transmit signals containing data representative of operating parameters of each wheel and an identification code identifying the electronic unit. Associated with information originating from a wheel speed sensor positioned in the vicinity of each of the wheels, the method makes it possible to locate the position of each of the wheels of the vehicle. In particular, this method involves, on the one hand, the ability of each electronic unit to identify its angular position as the wheel turns, something which requires a great deal of computation resources and usually leads to an increase in the energy consumption and therefore to a reduction in the life of the electronic unit and, on the other hand, the use of a set of wheel speed sensors, typically integrated into specific equipment of the ABS or ESP type, which operate individually on each wheel in order to supervise the instantaneous angular orientation thereof. The angular information supplied by the set of wheel speed sensors is then crossed with the angular information established by each of the TPMS sensors in order to definitively determine the position thereof. Now, certain categories of vehicle, particularly vehicles of the truck semitrailer type, are rarely equipped with such ABS or ESP systems, and this accordingly invalidates the application of such a location method.

SUMMARY OF THE INVENTION

An aspect of the present invention aims to overcome the aforementioned disadvantages by proposing an alternative for locating the position of each wheel of a motor vehicle. Another aspect of the invention aims to make it possible to detect uneven tire wear.

An aspect of the invention therefore relates to a method for locating the position of each wheelset of a motor vehicle, each wheelset comprising at least one wheel each equipped with an electronic unit comprising at least one sensor able to measure, for said wheel, the extent of the contact patch via which the tire is in contact with the ground, and a transmitter transmitting data regarding the extent of the tire contact patch to a control unit, said motor vehicle comprising a load sensor for each of the wheelsets that measures and delivers to the control unit a value for the load supported by the associated wheelset, said method being notable in that:

each electronic unit measures and then transmits to the control unit a value representative of the extent of the contact patch via which the tire is in contact with the ground, each load sensor measures then transmits to the control unit a measured supported load value associated with each wheelset, a determined supported load value associated with each electronic unit is determined, for each value of the extent of the contact patch via which the tire is in contact with the ground, when at least one measured supported load value differs from the other measured supported load values by more or less a first predetermined factor, said different measured supported load value is compared against the determined supported load values, the electronic unit of which the associated determined supported load value is substantially equal to said at least one different measured supported load value being assigned to the wheelset associated with the load sensor from which said different measured supported load value originates, the method continuing in order to assign a wheelset of the vehicle to each electronic device.

According to one embodiment of the invention in which embodiment the wheelset comprises two wheels each equipped with an electronic unit, a group of electronic units, which is made up of the electronic units with which the wheels of the one same wheelset are equipped, is identified beforehand.

Advantageously, the group of electronic units of which the sum of the associated determined supported load values is substantially equal to said at least one different measured supported load value is assigned to the wheelset associated with the load sensor from which said different measured supported load value originates.

According to another embodiment of the invention, the first predetermined factor is comprised between 3% and 7%, preferably 5%.

According to yet another embodiment of the invention, the transmission of data between the transmitter and the control unit is performed by one-way radiofrequency transmission.

According to yet another embodiment of the invention, the transmission of data between the transmitter and the control unit is performed by a two-way communications means.

Advantageously, the control unit controls each electronic unit in such a way as to make it measure the extent of the contact patch via which the associated wheel is in contact with the ground.

According to yet another embodiment of the invention, the method comprises an additional step consisting in comparing, for each wheelset assigned to an electronic unit or to a group of electronic units, the measured supported load value for said wheelset and the determined supported load value for said wheelset so as to detect a problem of alignment and/or uneven tire wear affecting the at least one wheel of said wheelset.

Advantageously, when the determined supported load value and the measured supported load value differ by more than 10%, a problem of alignment and/or uneven tire wear affecting the at least one wheel of said wheelset is detected.

Advantageously also, the method comprises an additional step consisting in informing the user of the vehicle of a problem of alignment and/or of uneven tire wear affecting the at least one wheel of a wheelset of the vehicle and of the position of said wheelset.

One advantage of an aspect of the present invention lies in the locating of the position of each wheel of a motor vehicle.

Another advantage of an aspect of the present invention lies in the detection of a problem of alignment and/or of uneven tire wear affecting a wheel of a vehicle.

Yet another advantage of an aspect of the present invention lies in the use of identical parameters for locating a wheel of a vehicle and for detecting a problem of alignment and/or of uneven tire wear affecting a wheel of a vehicle.

BRIEF DESCRIPTION OF THE DRAWINGS

Other features, advantages and details of aspects of the invention will become more apparent upon studying the remainder of the description that will follow in connection with the drawings in which:

FIG. 1 depicts a schematic view of a motor vehicle, and

FIG. 2 is a flow diagram illustrating the various steps of the method according to an aspect of the invention.

DETAILED DESCRIPTION OF THE PREFERRED EMBODIMENTS

As described previously, an aspect of the invention relates to a method for locating the position of each wheelset of a motor vehicle. According to one embodiment of the invention, the method also makes it possible to detect uneven tire wear affecting a wheel of a motor vehicle or a problem with the wheel alignment of one of the wheels of a motor vehicle.

In order to do that, the method according to an aspect of the invention employs, on the one hand, measurement sensors able to supply information relating to the extent of the contact patch via which each tire of each wheel of each wheelset of the motor vehicle makes contact with the ground and, on the other hand, an on-board weighing system comprising a load sensor associated with each end of an axle and able to supply a value for the load supported by each wheelset.

In the context of an aspect of the present invention, what is meant by a wheelset is a wheel or a collection of wheels situated at one end of an axle. Thus, the wheelset according to the invention comprises at least one wheel. The wheelset according to an aspect of the invention may equally comprise two wheels or even a greater number of wheels.

FIG. 1 depicts a motor vehicle 1 that may serve to implement the method and FIG. 2 depicts a flow diagram illustrating the various steps of the method according to one embodiment of the invention.

The motor vehicle 1 furthermore comprises wheelsets 11, 12, 13, 14 each one made up of at least one wheel each wheel being equipped with an electronic unit 21, 22, 23, 24. Each electronic unit 21, 22, 23, 24 comprises measurement sensors able periodically to measure various parameters concerning the associated wheel. The wheel parameters relate in particular to the pressure, the temperature of the tire of the wheel and also to the extent of the contact patch via which the tire is in contact with the ground.

The extent of the contact patch via which the tire is in contact with the ground can be measured for example using a measurement sensor of TPMS (Tire Pressure Monitoring System) type situated on an internal face of a tread of the tire of a wheel. The measurement sensor is connected to a microprocessor integrated into the electronic unit and also to a transmitter 211, 221, 231, 241.

The transmitter 211, 221, 231, 241 is able to transmit a signal containing data regarding the extent of the contact patch via which the tire is in contact with the ground to a control unit 40 situated on the motor vehicle. The control unit further comprises a data reception and transmission means 41.

The data may thus be transmitted from the transmitter 211, 221, 231, 241 to the control unit 40 by one-way radiofrequency transmission. Alternatively, the data may be transmitted from the emitter to the control unit by a means of two-way communication between the control unit 40 and the electronic units 21, 22, 23, 24. By way of example, this two-way communication may be a combination of Ultra High Frequency (UHF) radio signals in one direction and low frequency (LF) radio signals in the other. It may also be a communication system of the BlueTooth® Low Energy (BLE) type.

The two-way transmission advantageously allows the control unit 40 to operate each electronic unit 21, 22, 23, 24 in such a way as to make it measure the extent of the contact patch via which the tires are in contact with the ground for example at moments suitable for carrying out the determining of the location. This also allows the measuring of the extent of the contact patch via which the tires are in contact with the ground to be performed on demand rather than continuously at pre-established time intervals. This further makes it possible to limit the electrical energy consumption of the electronic unit 21, 22, 23, 24.

Thus, in a step E10, each electronic unit 21, 22, 23, 24 of each wheel of the vehicle measures, then transmits to the control unit 40, a value for the extent of the contact patch via which the tire associated with the electronic unit 21, 22, 23, 24 is in contact with the ground.

A determined supported load value associated with each electronic unit 21, 22, 23, 24 is then determined, in a step E20, for each value of the extent of the contact patch via which the tire is in contact with the ground, The determined supported load can be determined from the value of the extent of the contact patch via which the tire is in contact with the ground, using the following formula:

$$m=P*S^K/g \quad \text{[Math1]}$$

in which
m represents the measured supported load, in kg,
P represents the pressure measured by the measurement sensor, in N/m$^3$,
S represents the extent of the contact patch, in m$^3$, and
K represents a constant proportional to the geometry of the tire.

The way in which the load supported by a tire is determined from the value of the extent of the contact patch via which the tire is in contact with the ground is known to those skilled in the art. Reference may be made for example to patent EP 3237239.

The motor vehicle 1 also comprises suspension systems each associated with each of the wheelsets 11, 12, 13, 14 of the vehicle 1. Each suspension system further comprises a load sensor 31, 32, 33, 34 situated in the vicinity of each wheelset 11, 12, 13, 14 for example at each end of the axles, and able to measure the load supported by each wheelset 11, 12, 13, 14. It will be noted that the load sensors 31, 32, 33, 34, of the on-board weighing (OBW) system type, are present on vehicles of the truck and semitrailer type, whereas these types of vehicles are not wholly, or even not at all, fitted with an ABS system.

Thus, in a step E30, each load sensor 31, 32, 33, 34 measures then transmits to the control unit 40 a measured supported load value associated with each wheelset 11, 12, 13, 14. The signal received by the control unit 40 is located in as much as a wheelset 11, 12, 13, 14 is associated with each measured supported load value.

Thus, the control unit 40 receives measured supported load data originating from each load sensor 31, 32, 33, 34 associated with each wheelset 11, 12, 13, 14 of the vehicle 1, and determined supported load data associated with each electronic unit 21, 22, 23, 24. In standard use of the vehicle 1 with tires that are in good condition, the measured and determined supported load values are substantially equal for a given wheel. Thus, the method according to an aspect of the invention makes it possible, in a step E50, to compare, on the one hand, the measured, with on the other hand, the determined, supported load values, so as to assign a wheelset 11, 12, 13, 14 of the vehicle 1 with each electronic unit 21, 22, 23, 24. This makes it possible to locate the position of each wheelset 11, 12, 13, 14 of the motor vehicle 1. However, it is necessary to be able to associate the right determined load value with the measured supported load value. This is something that cannot be done when the measured supported load values are substantially equal for each wheel of the vehicle.

Thus, in a step E40, the measured supported load values are compared in order to determine a measured supported load value that is different. A measured supported load value is considered to be different when it differs from the other measured supported load values by more or less a first predetermined factor; said different measured supported load value is compared against the determined supported load values. Advantageously, a measured supported load value is considered to be different than the others when it differs more or less by the largest error in the precision of measurement performed by the load sensors. According to one embodiment of the invention, the first predetermined factor is comprised between 3% and 7%, preferably 5%.

Next, the electronic unit 21, 22, 23, 24 of which the associated determined supported load value differs by more or less a second predetermined factor from said different measured supported load value is assigned, in a step E60, to the wheelset 11, 12, 13, 14 associated with the suspension system from which said different measured supported load value originates. Advantageously, a determined supported load value is considered to be substantially equal to a measured supported load value when these differ by less than 5%.

What is therefore needed is a situation in which one measured supported load value is different than the others. This is for example the case when accelerating under cornering. Conversely, during a phase of driving at constant speed in a straight line, the measured supported load value will be substantially the same for each wheel of the motor vehicle.

Thus, it is particularly advantageous to be able to initiate measurement of the extent of the contact patch via which a tire is in contact with the ground via a two-way communication between the electronic unit 21, 22, 23, 24 and the control unit 40. It is thus possible to initiate a sequence of periodically measuring the extent of the contact patch via which the tire is in contact with the ground in such a way as to acquire data series throughout the dynamic evolution of the vehicle 1. These data series are then correlated against the evolution in measured supported load for each wheelset 11, 12, 13, 14 so as to associate a wheelset 11, 12, 13, 14 of the motor vehicle 1 with each electronic unit 21, 22, 23, 24 or pair of electronic units.

That makes it possible to dispense with the need for dynamic data which may for example be obtained via acceleration sensors.

Once a first electronic unit 21, 22, 23, 24 has been associated with a wheelset 11, 12, 13, 14 of the vehicle 1, the method continues in such a way as to assign a wheelset 11, 12, 13, 14 of the vehicle 1 with each electronic unit 21, 22, 23, 24.

According to one embodiment of the invention which embodiment has not been depicted in a figure, the wheelset comprises two wheels, referred to as twin wheels. Each twin wheel comprises an electronic unit able to measure and to transmit to the central unit a value representative of the extent of the contact patch via which the tire is in contact with the ground, It is therefore appropriate to identify the electronic units originating from the same wheelset, so as to determine a group of electronic units.

According to one embodiment of the invention, the determined supported load values for the wheels of the motor vehicle are determined and compared. Determined supported load values that are substantially equal or that exhibit the same dynamic over a determined period of time are then identified as originating from a group of electronic units of one wheelset.

Thus, the determined supported load is determined for each value of extent of contact patch in which the tire of a wheelset is in contact with the ground. The determined supported loads originating from a group of electronic units are then summed.

When the measured supported load value of a wheelset comprising several wheels is compared against the determined supported load value, it is the sum of the determined supported load values of the group of electronic units that is compared against the different measured supported load value. Thus, the group of electronic units of which the sum of the associated determined supported load values is substantially equal to said at least one different measured supported load value is assigned to the wheelset associated with the load sensor from which said different measured supported load value originates.

According to one embodiment of the invention, the method also makes it possible to detect uneven tire wear affecting at least one wheel of the wheelset 11, 12, 13, 14 of a vehicle 1 when the position of each wheelset 11, 12, 13, 14 is located.

The method therefore comprises an additional step consisting in comparing, in a step E70, for each wheelset 11, 12, 13, 14 previously assigned for example according to an aspect of the invention to an electronic unit 21, 22, 23, 24 or to a group of electronic units, the measured supported load value for said wheelset 11, 12, 13, 14 and the determined supported load value for said wheelset 11, 12, 13, 14, so as to detect uneven tire wear affecting the at least one wheel of said wheelset 11, 12, 13, 14. Specifically, the load sensors 31, 32, 33, 34 of the suspension systems of the motor vehicle 1 provide reference information that is independent of the tire wear of the wheel. Conversely, determining the determined supported load from the value of the extent of the contact patch via which the tire is in contact with the ground, is dependent on the tire wear. Specifically, a tire that is unevenly worn will exhibit a contact patch that differs in extent from that of tire that is evenly worn.

Thus, divergence between the measured and determined supported load value is an indicator of a problem of alignment and/or of uneven tire wear affecting a wheel of a wheelset 11, 12, 13, 14. Thus, according to one embodiment of the invention, when the determined supported load value for a wheelset 11, 12, 13, 14 and the measured supported load value for a tire of the at least one wheel of a wheelset 11, 12, 13, 14 differ by more than 10%, uneven tire wear and/or defective alignment affecting at least one wheel of a wheelset 11, 12, 13, 14 is detected, in a step E80. As a preference, a tire is considered to have worn unevenly and/or to be poorly aligned when the associated determined and supported measured load values differ by more than 10%, and do so repeatedly and in a way that can be observed over a plurality of running cycles and therefore over a plurality of measurements.

Ultimately, the method according to an aspect of the invention makes it possible to detect and, in a step E90, to inform the driver of a motor vehicle 1 of uneven tire wear affecting a wheel of a wheelset 11, 12, 13, 14 of the vehicle 1 and of the position of said wheelset 11, 12, 13, 14.

The method according to an aspect of the invention can be implemented on all motor vehicles, particularly on trucks, heavy duty vehicles, trailers and semitrailers.

The invention claimed is:

1. A method for locating a position of each wheelset of a motor vehicle, each wheelset comprising at least one wheel each equipped with an electronic unit comprising at least one sensor able to measure, for said wheel, an extent of a contact patch via which the tire is in contact with a ground, and a transmitter transmitting data regarding the extent of the tire contact patch to a control unit, said motor vehicle comprising a load sensor for each of the wheelsets that measures and delivers to the control unit a value for the load supported by the associated wheelset, said method comprising:
    each electronic unit measuring and then transmitting to the control unit a value representative of the extent of the contact patch via which the tire is in contact with the ground,
    each load sensor measuring and then transmitting to the control unit a measured supported load value associated with each wheelset,
    determining a determined supported load value associated with each electronic unit, for each value of the extent of the contact patch via which the tire is in contact with the ground,
    when at least one measured supported load value differs from the other measured supported load values by more or less a first predetermined factor, said different measured supported load value is compared against the determined supported load values,
    the electronic unit of which the associated determined supported load value is substantially equal to said at least one different measured supported load value being assigned to the wheelset associated with the load sensor from which said different measured supported load value originates,
    the method continuing in order to assign a wheelset of the vehicle to each electronic unit.

2. The method as claimed in claim 1, wherein the first predetermined factor is comprised between 3% and 7%, preferably 5%.

3. The method as claimed in claim 1, wherein the transmission of data between the transmitter and the control unit is performed by one-way radiofrequency transmission.

4. The method as claimed in claim 1, wherein the wheelset comprises two wheels each equipped with an electronic unit, wherein a group of electronic units, which is made up of the electronic units with which the wheels of the one same wheelset are equipped, is identified beforehand.

5. The method as claimed in claim 4, wherein the group of electronic units of which a sum of the associated determined supported load values is substantially equal to said at least one different measured supported load value is assigned to the wheelset associated with the load sensor from which said different measured supported load value originates.

6. The method as claimed in claim 1, wherein the transmission of data between the transmitter and the control unit is performed by a two-way communications means.

7. The method as claimed in claim 6, wherein the control unit controls each electronic unit in such a way as to make it measure the extent of the contact patch via which the associated wheel is in contact with the ground.

8. The method as claimed in claim 1, further comprising an additional step of comparing, for each wheelset assigned to an electronic unit or to a group of electronic units, the measured supported load value for said wheelset and the determined supported load value for said wheelset so as to detect a problem of alignment and/or uneven tire wear affecting the at least one wheel of said wheelset.

9. The method as claimed in claim 8, wherein, when the determined supported load value and the measured supported load value differ by more than 10%, a problem of alignment and/or uneven tire wear affecting the at least one wheel of said wheelset is detected.

10. The method as claimed in claim 9, further comprising informing a user of the vehicle of a problem of alignment and/or of uneven tire wear affecting the at least one wheel of a wheelset of the vehicle and of the position of said wheelset.

\* \* \* \* \*